(12) United States Patent
Schmalz et al.

(10) Patent No.: US 10,384,156 B2
(45) Date of Patent: Aug. 20, 2019

(54) FILTER MEDIA COMPRISING FIBERS INCLUDING CHARGED PARTICLES

(71) Applicant: Hollingsworth & Vose Company, East Walpole, MA (US)

(72) Inventors: Elke Schmalz, Chemnitze (DE); Marlina Seipp, Allendorf (DE); Juergen Battenfeld, Battenberg (DE)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 14/484,524

(22) Filed: Sep. 12, 2014

(65) Prior Publication Data

US 2016/0074787 A1    Mar. 17, 2016

(51) Int. Cl.

| | |
|---|---|
| *B01D 24/00* | (2006.01) |
| *B01D 39/02* | (2006.01) |
| *B01D 39/16* | (2006.01) |
| *B01D 39/20* | (2006.01) |
| B01D 39/00 | (2006.01) |

(52) U.S. Cl.
CPC ......... *B01D 39/02* (2013.01); *B01D 39/1623* (2013.01); *B01D 39/2017* (2013.01); *B01D 2239/064* (2013.01); *B01D 2239/1233* (2013.01)

(58) Field of Classification Search
CPC ........ B01D 24/00; B01D 39/00; B01D 39/02; B01D 39/06; B01D 2101/00; B01D 2239/02; B01D 2239/0208; B01D 2239/0216; B01D 2239/0407; B01D 2239/0464

USPC .... 210/660, 681, 767, 502.1, 503, 504, 505, 210/506, 508
See application file for complete search history.

(56) References Cited

U.S. PATENT DOCUMENTS

| | | | |
|---|---|---|---|
| 4,061,827 A | 12/1977 | Gould | |
| 4,309,290 A * | 1/1982 | Heitkamp | .......... B01J 20/28009 210/222 |
| 4,537,807 A | 8/1985 | Chan et al. | |
| 4,592,815 A | 6/1986 | Nakao | |
| 4,812,145 A | 3/1989 | Labonte | |
| 5,069,799 A | 12/1991 | Brownawell et al. | |
| 5,076,846 A | 12/1991 | Buri et al. | |
| 5,370,911 A | 12/1994 | Throne et al. | |
| 5,580,459 A | 12/1996 | Powers et al. | |

(Continued)

OTHER PUBLICATIONS

"Amberlite", PDF accessed Dec. 18, 2015.*

(Continued)

*Primary Examiner* — Allison G Fitzsimmons
(74) *Attorney, Agent, or Firm* — Wolf, Greenfield & Sacks, P.C.

(57) ABSTRACT

Filter media, including those suitable for hydraulic and/or other applications, and related filter elements and methods associated therewith, are provided. In some embodiments, a filter media described herein may include a layer (e.g., a non-woven layer) comprising a blend of glass fibers and polymeric fibers. The polymeric fibers may comprise a plurality of charged particles at least partially embedded within the polymeric fibers. In some embodiments, the layer comprising the fiber blend may result in an increased air permeability, dust holding capacity, and/or hydraulic gamma (a high ratio of air permeability to efficiency), as compared to filter media that do not include such charged particles.

20 Claims, 2 Drawing Sheets

(56) References Cited

U.S. PATENT DOCUMENTS

| | | | |
|---|---|---|---|
| 5,672,399 A | 9/1997 | Kahlbaugh et al. | |
| 5,785,725 A | 7/1998 | Cusick et al. | |
| 6,171,684 B1 | 1/2001 | Kahlbaugh et al. | |
| 6,444,312 B1 | 9/2002 | Dugan | |
| 6,458,230 B1 | 10/2002 | Rupaner et al. | |
| 6,849,156 B2 | 2/2005 | Besemer et al. | |
| 7,008,465 B2 | 3/2006 | Graham et al. | |
| 7,137,510 B1 | 11/2006 | Klein et al. | |
| 7,314,497 B2 | 1/2008 | Kahlbaugh et al. | |
| 7,510,653 B2 | 3/2009 | Martin et al. | |
| 7,647,890 B1 | 1/2010 | Yananton | |
| 7,655,070 B1* | 2/2010 | Dallas | B01D 39/04 |
| | | | 210/502.1 |
| 7,913,858 B2 | 3/2011 | Haberkamp et al. | |
| 2001/0001312 A1 | 5/2001 | Mitchell et al. | |
| 2001/0004927 A1 | 6/2001 | Greenwood et al. | |
| 2001/0021453 A1 | 9/2001 | Hansen et al. | |
| 2001/0040136 A1 | 11/2001 | Wei et al. | |
| 2002/0081930 A1 | 6/2002 | Jackson et al. | |
| 2002/0147240 A1 | 10/2002 | Persson et al. | |
| 2002/0155281 A1 | 10/2002 | Lang et al. | |
| 2002/0176877 A1 | 11/2002 | Cole et al. | |
| 2003/0045645 A1 | 3/2003 | Chang et al. | |
| 2004/0020245 A1 | 2/2004 | Rosenflanz et al. | |
| 2004/0054331 A1 | 3/2004 | Hamilton et al. | |
| 2004/0058606 A1 | 3/2004 | Branham et al. | |
| 2004/0120904 A1 | 6/2004 | Lye et al. | |
| 2004/0132607 A1 | 7/2004 | Wood et al. | |
| 2005/0013992 A1 | 1/2005 | Azad et al. | |
| 2005/0079379 A1 | 4/2005 | Wadsworth et al. | |
| 2005/0089679 A1 | 4/2005 | Ittel et al. | |
| 2005/0136265 A1 | 6/2005 | Liu et al. | |
| 2006/0096263 A1 | 5/2006 | Kahlbaugh et al. | |
| 2007/0003603 A1 | 1/2007 | Karandikar et al. | |
| 2007/0054104 A1 | 3/2007 | Ittel et al. | |
| 2007/0056256 A1 | 3/2007 | Tepper et al. | |
| 2008/0020193 A1 | 1/2008 | Jang et al. | |
| 2008/0115695 A1 | 5/2008 | Sujeeth et al. | |
| 2008/0164195 A1 | 7/2008 | Siwak | |
| 2009/0004413 A1 | 1/2009 | Wagner et al. | |
| 2009/0099541 A1 | 4/2009 | Qin et al. | |
| 2009/0259158 A1 | 10/2009 | Messier | |
| 2010/0031617 A1 | 2/2010 | Ensor et al. | |
| 2010/0031618 A1 | 2/2010 | Grove, III | |
| 2010/0187171 A1* | 7/2010 | Gupta | D21H 13/40 |
| | | | 210/491 |
| 2010/0274209 A1 | 10/2010 | Roe et al. | |
| 2011/0092726 A1 | 4/2011 | Clarke | |
| 2011/0174158 A1 | 7/2011 | Walls et al. | |
| 2011/0223581 A1 | 9/2011 | Stobbe | |
| 2011/0251574 A1 | 10/2011 | Hedrich et al. | |
| 2013/0098271 A1 | 4/2013 | Eberwein et al. | |
| 2013/0340962 A1 | 12/2013 | Gupta et al. | |

OTHER PUBLICATIONS

Dowex, Jun. 2000, pp. 1-9.*
Harenbrock, Ageing of Filter Media in Automotive Engine Oils. International 14$^{th}$ International Colloquium Tribology. Jan. 13-15, 2004.
Livingstone et al., Finding the Root Causes of Oil Degradation. Machinery Lubrication. Jan. 2007.
International Search Report and Written Opinion for Application No. PCT/US15/49612 dated Dec. 29, 2015.
[No Author Listed], Definition of "Embed" from Oxford Dictionary. Oxford University Press, 2016. Last accessed on Dec. 20, 2016 from < https://en.oxforddictionaries.com/definition/us/EMBED>.
PCT/US15/49612, Dec. 29, 2015, International Search Report and Written Opinion.

* cited by examiner

FILTER MEDIA COMPRISING FIBERS INCLUDING CHARGED PARTICLES

FIELD OF THE INVENTION

Filter media, and more particularly filter media comprising fibers that include charged particles, are provided.

BACKGROUND

Filter media can be used to remove contamination in a variety of applications. Depending on the application, the filter media may be designed to have different performance characteristics. For example, filter media may be designed to have performance characteristics suitable for hydraulic applications which involve filtering contamination in pressurized fluids.

In general, filter media can be formed of a web of fibers. For example, the web may include glass and/or polymeric fibers amongst other components. The fiber web provides a porous structure that permits fluid (e.g., hydraulic fluid) to flow through the filter media. Contaminant particles contained within the fluid may be trapped on the fibrous web. Filter media characteristics, such as fiber diameter and basis weight, affect filter performance including filter efficiency, dust holding capacity (i.e., dirt holding capacity) and resistance to fluid flow through the filter.

There is a need for filter media that can be used in a variety of applications, including hydraulic applications, which has a desirable balance of properties including a high dust holding capacity and a low resistance to fluid flow (high permeability) across the filter media.

SUMMARY

Filter media comprising fibers including charged particles are provided.

In one set of embodiments, a filter media comprises a non-woven web. The non-woven web comprises a plurality of glass fibers having an average fiber diameter of less than or equal to about 10 microns, and a plurality of polymeric fibers having an average fiber diameter of greater than or equal to about 5 microns. The polymeric fibers comprise a plurality of charged particles having an average diameter of greater than or equal to about 0.01 microns at least partially embedded within the polymeric fibers. The non-woven web has an air permeability of greater than or equal to about 5 cfm/sf and less than or equal to about 400 cfm/sf and a basis weight of greater than or equal to about 30 g/m$^2$ and less than or equal to about 400 g/m$^2$.

Filter elements including the filter media described above and herein are also provided. Methods of filtering fluids including such filter media and filter elements are also provided.

DETAILED DESCRIPTION

Filter media, including those suitable for hydraulic and/or other applications, and related components, systems, and methods associated therewith, are provided. In some embodiments, a filter media described herein may include a layer (e.g., a non-woven layer) comprising a blend of glass fibers and polymeric fibers. In certain embodiments, the polymeric fibers are relatively coarse. The polymeric fibers may comprise a plurality of charged particles at least partially embedded within the polymeric fibers. In some embodiments, the layer comprising the fiber blend may have desirable properties including one or more of a high air permeability, a high dust holding capacity, and a high hydraulic gamma, e.g., a high ratio of air permeability to efficiency. In certain embodiments, the filter media may include two or more layers, at least one of the layers comprising a blend of glass fibers and polymeric fibers. In some such cases, the filter media may include one or more layers (e.g., one or more pre-filter layers) that serve to enhance the overall properties of the filter media (e.g., dust holding capacity, mechanical properties).

Filter media comprising a plurality of charged particles (e.g., charged particles at least partially embedded within fibers) offer several advantages over filter media without such particles. For example, because of the charges imparted by the particles, the filter media may capture more unwanted species (e.g., dust, particles, or other components in the fluid to be filtered) and may be able to achieve efficiencies with coarser fibers that would otherwise generally be obtainable using finer fibers. The use of coarser fibers may lead to media which has a higher dust holding capacity and lower pressure drop compared to media that uses relatively more fine fibers, all other factors being equal. Therefore, by using relatively coarse of fibers with charge particles, one may achieve media with good efficiencies, higher dust holding capacities, and/or lower pressure drop. In addition, in certain embodiments in which the charged particles are at least partially embedded within fibers, the media can maintain their charge over time (e.g., during fluid filtration), because the particles are resistant to dislodging from the filter media during filtration and the charges do not dissipate (or, minimally dissipate) over time.

Figure 1:
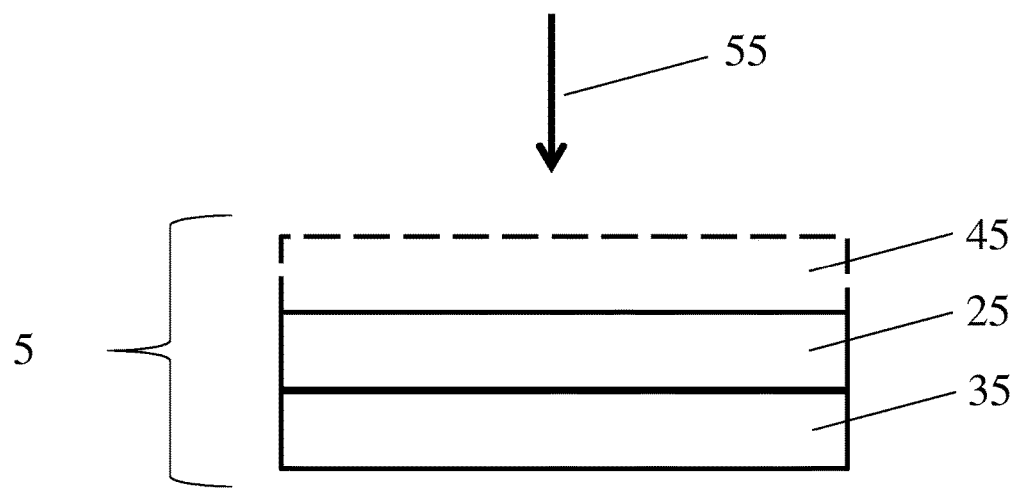
FIG. 1 is a side view illustration of a filter media including a pre-filter layer and a filtration layer according to one set of embodiments.
Figure 2:
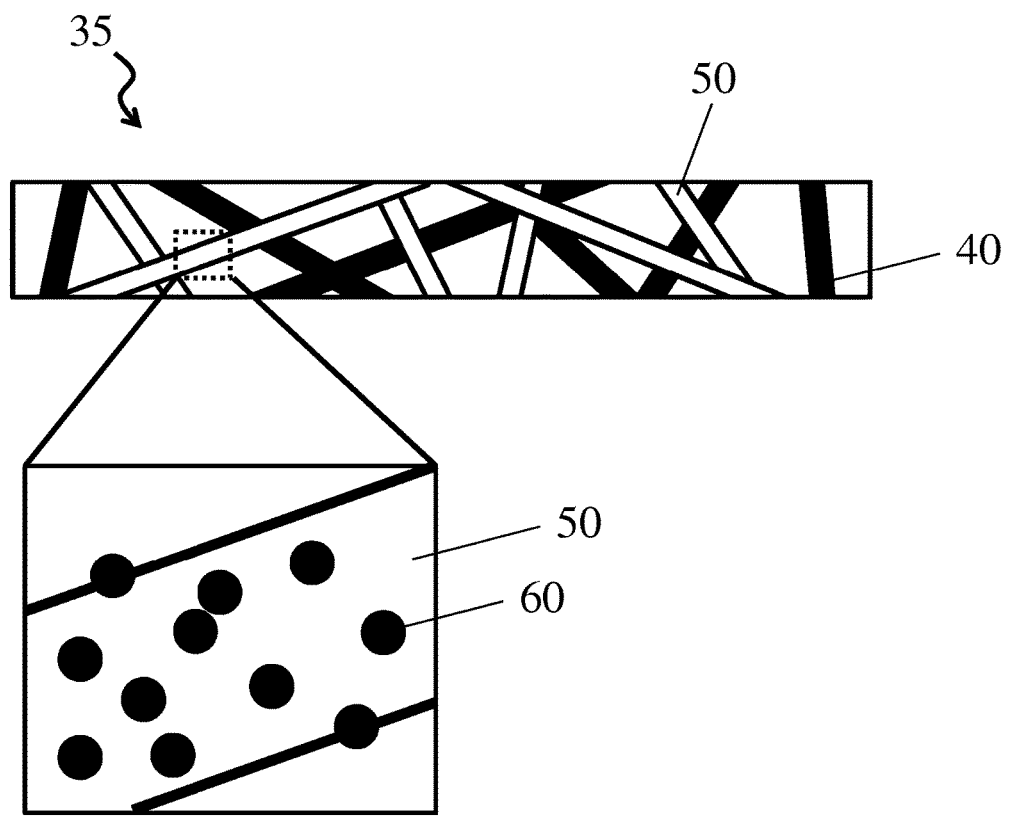
FIG. 2 is a side view illustration of a filtration layer including a plurality of particles according to one set of embodiments.

Non-limiting examples of filter media described herein are shown illustratively in FIGS. 1 and 2. As shown in the embodiment illustrated in FIG. 1, a filter media 5 includes a first layer 25 adjacent a second layer 35. The first layer may be, for example, a pre-filter layer. The second layer may be, for instance, a filtration layer (e.g., a main filtration layer). The filtration layer may include, in some embodiments, a blend of fibers, such as glass fibers and polymeric fibers. In certain embodiments, the polymeric fibers are relatively coarse and may comprise a plurality of charged particles at least partially embedded within the polymeric fibers.

Optionally, the filter media can include a third layer 45 (e.g., an additional pre-filter layer or an additional filtration layer) adjacent the first layer. In some embodiments, one or more, or each of the layers within the filter media, are non-woven layers. Additional layers, e.g., fourth, fifth, or sixth layers (e.g., up to 10 layers), may also be included in some cases. The orientation of the filter media relative to fluid flow through the media can generally be selected as desired. As shown illustratively in FIG. 1, the first layer is upstream of the second layer in the direction of fluid flow indicated by arrow 55. In other embodiments, however, the first layer is downstream of the second layer in the direction of fluid flow through the filter media.

As used herein, when a layer is referred to as being "adjacent" another layer, it can be directly adjacent the layer, or an intervening layer also may be present. A layer that is "directly adjacent" or "in contact with" another layer means that no intervening layer is present.

In some cases, each of the layers of the filter media has different characteristics and filtration properties that, when combined, result in desirable overall filtration performance, for example, as compared to a filter media having a single-layer structure. For example, in one set of embodiments, the first layer (e.g., layer 25) is a pre-filter layer (e.g., a "loading layer") and the second layer (e.g., layer 35) is a filtration layer (e.g., an "efficiency layer"). Generally, a pre-filter layer may be formed using coarser fibers, and therefore has a lower resistance to fluid flow, than that of a filtration layer. The one or more filtration layers may include fibers (e.g., polymeric fibers, glass fibers) and may have a higher resistance to fluid flow and/or a smaller mean flow pore size than that of a pre-filter layer. As such, a filtration layer can generally trap particles of smaller size compared to the pre-filter layer. In one example, filter media 5 of FIG. 1 includes one or more pre-filter layers (e.g., layers 25 and/or 45) and a filtration layer (e.g., layer 35) comprising a blend of glass fibers and polymeric fibers. The filtration layer may be formed of fibers having a smaller average fiber diameter than that of the one or more pre-filter layers.

In some embodiments in which a third layer is present, e.g., as shown illustratively in FIG. 1, the third layer may be an additional pre-filter layer that has the same or different properties as first layer 25. For example, the third layer may have even coarser fibers and a lower resistance to fluid flow than that of first layer 25. In other embodiments, the third layer may be an additional filtration layer that has the same or different properties as second layer 35. For example, the third layer may have even finer fibers and a higher resistance to fluid flow than that of second layer 35. In some embodiments, the third layer comprises a blend of glass fibers and polymeric fibers as described in more detail below. It should be understood that the presence of a third layer or even a second layer in a media is optional and not necessarily present in all embodiments.

In some embodiments, as illustrated in FIG. 2, second layer 35 (e.g., a filtration layer) comprises glass fibers 40 and polymeric fibers 50. In some such embodiments, the filtration layer may comprise a plurality of particles 60 (e.g., charged particles) at least partially embedded in polymeric fibers 50.

In certain embodiments, at least a portion of the plurality of particles are embedded (e.g., partially or fully) within the polymeric fibers. This configuration can prevent the particles from dislodging from the media during filtration and otherwise contaminating the fluid to be filtered. In embodiments in which a particle is partially embedded within a polymeric fiber, a first portion of the particle may be embedded in the polymeric material forming the fiber, and a second portion of the particle may be exposed (i.e., not in contact with the polymeric material forming the fiber). The second portion may be exposed to the environment, or may be exposed to (e.g., in contact with) a resin or other material coating the fiber. In some instances, the plurality of particles are substantially embedded within the polymeric fiber. In certain embodiments, at least a portion of the plurality of particles may be adhered to the surface of the polymeric fibers.

The plurality of particles included in a filtration layer can have any suitable average diameter. As used herein, the average diameter of particles refers to the average largest cross-sectional dimension of the particles. In certain embodiments, the plurality of particles may have an average diameter of, for example, less than or equal to about 1 micron, less than or equal to about 0.7 microns, less than or equal to about 0.5 microns, less than or equal to about 0.4 microns, less than or equal to about 0.3 microns, less than or equal to about 0.2 microns, less than or equal to about 0.1 microns, or less than or equal to about 0.05 microns. In some embodiments, the plurality of particles may have an average diameter of greater than or equal to about 0.01 microns, greater than or equal to about 0.05 microns, greater than or equal to about 0.1 microns, greater than or equal to about 0.2 microns, greater than or equal to about 0.3 microns, greater than or equal to about 0.4 microns, greater than or equal to about 0.5 microns, or greater than or equal to about 0.8 microns. Combinations of the above-referenced ranges are also possible (e.g., between about 0.1 microns and about 0.5 microns, between about 0.1 microns and about 1 micron, between about 0.01 microns and between about 1 micron). Other ranges are also possible. In some embodiments, the plurality of particles have an average diameter less than an average diameter of the polymeric fibers.

The particles can be made from any suitable material. Non-limiting examples of suitable particle materials include ceramics, glasses, metals (e.g., ferrous metals, non-ferrous metals, pure metals, alloys), polymers, and composites. Suitable particles may exhibit a range of surface roughness and mechanical properties (e.g., hardness, elastic modulus).

In some embodiments, the plurality of particles may be charged. For example, in some cases, the plurality of particles may have a net negative charge, e.g., the plurality of particles may comprise an anion. Non-limiting examples of suitable anions include hydrides, oxides, fluorides, sulfides, chlorides, bromides, oxoanions, phosphates (e.g., hydrogen phosphates, dihydrogen phosphates), sulfates (e.g., hydrogen sulfate), nitrates, nitrites, sulfites, chlorates, bromates, chlorites, carbonates, chromates, acetates, and formates. In some embodiments, the anion is an anion from an organic acid. In certain embodiments, the anion is an anion from a complex salt. Other types of anions may also be possible.

In some embodiments, the negatively charged particles may have an average charge of −4 or greater, −3 or greater, −2 or greater, or −1 greater. The particles may have an average charge of less than 0, −1 or less, −2 or less, −3 or less, or −4 or less. Combinations of the above-referenced ranges are also possible.

In some cases, the charged particles may be positively charged. For example, in some cases, the plurality of particles may have a net positive charge, e.g., the plurality of particles may comprise a cation. Non-limiting examples of suitable cations include aluminum, ammonium, barium, calcium, chromium (II), chromium (III), copper (I), copper (II), iron (II), iron (III), lithium, magnesium, potassium, silver, sodium, and zinc. Other types of cations may also be possible.

In some embodiments, the positively charged particles may have an average charge of +4 or less, +3 or less, +2 or less, or +1 less. The particles may have an average charge of greater than 0, at least +1, at least +2, at least +3, or at least +4. Combinations of the above-referenced ranges are also possible. Negatively charged particles, positively charged particles, or combinations thereof may be included within a layer (e.g., at least partially embedded within the polymeric fibers).

In some embodiments, a layer may comprise more than one type of polymeric fiber with particles at least partially embedded within the polymeric fiber. Different types of polymeric fibers may include, for example, polymeric fibers having at least one difference in a physical property such as average fiber diameter, average fiber length, polymer type, particle type, particle charge, average particle diameter, mechanical property, etc.

The weight percentage of charged particles in a layer may vary. For example, in some embodiments, the weight percentage of charged particles included in a filtration layer (e.g., embedded within the polymeric fibers of the layer) is at least about 0.1 wt %, at least about 0.5 wt %, at least about 1 wt %, at least about 2 wt %, at least about 3 wt %, at least about 4 wt %, at least about 5 wt %, at least about 7 wt %, or at least about 9 wt % of the layer. In some embodiments, the weight percentage of charged particles included in a filtration layer (e.g., at least partially embedded within the polymeric fibers of the layer) is less than or equal to about 10 wt %, less than or equal to about 7 wt %, less than or equal to about 5 wt %, less than or equal to about 4 wt %, less than or equal to about 3 wt %, less than or equal to about 2 wt %, or less than or equal to about 1 wt % of the layer. Combinations of the above-referenced ranges are also possible (e.g., between about 0.5 wt % and about 5 wt %, between about 1 wt % and about 3 wt %). Other ranges are also possible. In some embodiments, the above-referenced ranges for weight percentage of charged particles may be with respect to the total weight of the polymeric fibers in the layer.

The weight percentage of polymeric fibers including charged particles in a layer may vary. As described herein, the charged particles may be at least partially embedded within the polymeric fibers. For instance, in some embodiments, the weight percentage of polymeric fibers including charged particles in a layer may be greater than or equal to about 1%, greater than or equal to about 5%, greater than or equal to about 10%, greater than or equal to about 15%, greater than or equal to about 20%, greater than or equal to about 25%, greater than or equal to about 30%, greater than or equal to about 40%, greater than or equal to about 50%, greater than or equal to about 60%, greater than or equal to about 70%, greater than or equal to about 80%, or greater than or equal to about 85%. e.g., based on the total weight of fibers in a layer. In some instances, the weight percentage of polymeric fibers including charged particles in a layer may be less than or equal to about 100%, less than or equal to about 90%, less than or equal to about 85%, less than or equal to about 80%, less than or equal to about 75%, less than or equal to about 70%, less than or equal to about 60%, less than or equal to about 50%, less than or equal to about 30%, less than or equal to about 20%, or less than or equal to about 15%, e.g., based on the total weight of fibers in the layer. Combinations of the above-referenced ranges are possible (e.g., greater than or equal to about 10% and less than or equal to about 90%, or greater than or equal to about 10% and less than or equal to about 30%). In some embodiments, the above weight percentages are based on the weight of the total dry solids of the layer (including any resins).

As described herein, in some embodiments, a filtration layer (e.g., a layer including charged particles) may comprise a blend of polymeric fibers and non-polymeric fibers. The weight percentage of polymeric fibers in the layer, regardless of whether or not the polymeric fibers includes charged particles, may vary. For instance, in some embodiments, the weight percentage of polymeric fibers in a layer may be greater than or equal to about 1%, greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 80%, or greater than or equal to about 85% based on the total weight of fibers in a layer. In some instances, the weight percentage of polymeric fibers may be less than or equal to about 100%, less than or equal to about 90%, less than or equal to about 85%, less than or equal to about 80%, less than or equal to about 75%, less than or equal to about 70%, less than or equal to about 60%, less than or equal to about 50%, less than or equal to about 30%, less than or equal to about 20%, or less than or equal to about 15% based on the total weight of fibers in the layer. Combinations of the above-referenced ranges are possible. In some embodiments, the above weight percentages are based on the weight of the total dry solids of the layer (including any resins).

The polymeric fibers including charged particles may have any suitable average fiber diameter. The average fiber diameter, as used herein, refers to the average largest cross-sectional dimension of the fibers, e.g., in embodiments in which the cross-sectional shape of the fiber is not circular. In certain embodiments, the polymeric fibers including charged particles may be relatively coarse. In some embodiments, the polymeric fibers in a layer may have an average diameter of less than or equal to about 30 microns, less than or equal to about 25 microns, less than or equal to about 20 microns, less than or equal to about 15 microns, less than or equal to about 10 microns, less than or equal to about 8 microns, or less than or equal to about 6 microns. In some instances, the average fiber diameter of the polymeric fibers within a layer may be greater than or equal to about 5 microns, greater than or equal to about 6 microns, greater than or equal to about 8 microns, greater than or equal to about 10 microns, greater than or equal to about 15 microns, greater than or equal to about 20 microns, or greater than or equal to about 25 microns. Combinations of the above-referenced ranges are also possible. For instance, in certain embodiments, the average diameter of the polymeric fibers may be between about 5 microns and about 30 microns, or between about 8 microns and about 15 microns.

Generally, the polymeric fibers including charged particles are non-continuous fibers. That is, the polymeric fibers are generally cut (e.g., from a filament) or formed as non-continuous discrete fibers to have a particular length or a range of lengths. In some embodiments, the polymeric fibers may have an average length of less than or equal to about 5 cm, less than or equal to about 3 cm, less than or equal to about 2 cm, less than or equal to about 18 mm, less than or equal to about 15 mm, less than or equal to about 12 mm, less than or equal to about 8 mm, less than or equal to about 6 mm, less than or equal to about 5 mm, less than or equal to about 3 mm, or less than or equal to about 2 mm. In some instances, the polymeric fibers may have an average length of greater than or equal to about 1 mm, greater than or equal to about 2 mm, greater than or equal to about 3 mm, greater than or equal to about 5 mm, greater than or equal to about 6 mm, greater than or equal to about 8 mm, greater than or equal to about 10 mm, greater than or equal to about 12 mm, greater than or equal to about 15 mm, greater than or equal to about 17 mm, greater than or equal to about 2 cm, or greater than or equal to about 3 cm. Combinations of the above-referenced ranges are possible (e.g., greater than or equal to about 1 mm and less than or equal to about 18 mm, greater than or equal to about 3 mm and less than or equal to about 8 mm).

In general, the polymeric fibers including charged particles (or the polymeric fibers of a filtration layer, generally) may have any suitable composition. Non-limiting examples of polymers that can be used to form fibers include PVA (polyvinyl alcohol), polyester (e.g., polybutylene terephthalate, polybutylene naphthalate, polycaprolactone), polyethylene, polypropylene, acrylic, polyolefin, polyamides (e.g., nylon), rayon, polycarbonates, polyphenylene sulfides, polystyrenes, polybutylene terephthalate, and polyurethanes (e.g., thermoplastic polyurethanes), regenerated cellulose, cellulose acetate, polymethyl methacrylate, polyaniline, polyaramid (e.g. para-aramid, meta-aramid), polyimide (e.g., polyetherimide), polyether ketone, polyethylene terephthalate, polyolefin, polyacrylics, polyether sulfones, poly(phenylene ether sulfone), polysulfones, polyacrylonitrile, polyvinylidene fluoride, poly(lactic acid), polyphenylene oxide, polypyrrole, zein, and combinations or copolymers (e.g., block copolymers) thereof. Optionally, the polymer(s) or copolymer(s) may contain fluorine atoms. Examples of such polymers include PVDF, PVDF-HFP (hexafluoropropylene) and PTFE. It should be appreciated that other appropriate polymeric fibers may also be used. The polymeric fibers may be formed of a synthetic polymer, i.e., non-naturally occurring polymeric materials. In some embodiments, the polymeric fibers comprise a thermoplastic polymer. In some embodiments, the polymeric fiber is chemically stable with hydraulic fluids for hydraulic applications. The polymeric fiber may be formed by any suitable process.

As noted above, in some embodiments polymeric fibers that do not include charged particles at least partially embedded within the fibers may be included in a filtration layer. Such fibers may have an average fiber diameter in one or more of the ranges described above, an average length in one or more of the ranges described above, and/or may be formed of one or more of the materials listed above for the polymeric fibers including charged particles.

As described herein, in some embodiments, a layer of the filter media (e.g., a first, second or third layer, such as a filtration layer) may comprise a blend of glass fibers and polymeric fibers.

The glass fibers of one or more layers of the filter media can have relatively small diameters. For example, the average diameter of the glass fibers in a layer may be less than or equal to about 20 microns, less than or equal to about 15 microns, less than or equal to about 10 microns, less than or equal to about 9 microns, less than or equal to about 7 microns, less than or equal to about 5 microns, less than or equal to about 3 microns, less than or equal to about 1 micron, less than or equal to about 0.5 microns, less than or equal to about 0.3 microns, or less than or equal to about 0.2 microns. In some embodiments, the average diameter of the glass fibers in a layer may be at least about 0.1 microns, at least about 0.2 microns, at least about 0.3 microns, at least about 0.5 microns, at least about 1 micron, at least about 3 microns, at least about 5 microns, at least about 7 microns, at least about 9 microns, at least about 10 microns, or at least about 15 microns. Combinations of the above-referenced ranges are also possible (e.g., between about 0.1 microns and about 20 microns, between about 0.2 microns and about 9 microns). In some embodiments, the average fiber diameter of the glass fibers is less than the average fiber diameters of the polymeric fibers present in a layer. The glass fibers may vary significantly in length as a result of process variations. In certain embodiments, the glass fibers may have an average length of less than or equal to about 12 mm, less than or equal to about 10 mm, less than or equal to about 8 mm, less than or equal to about 6 mm, less than or equal to about 4 mm, less than or equal to about 2 mm, less than or equal to about 1 mm, less than or equal to about 0.5 mm, or less than or equal to about 0.2 mm. In some instances, the average length of the glass fibers within a layer may be greater than or equal to about 0.1 mm, greater than or equal to about 0.2 mm, greater than or equal to about 0.5 mm, greater than or equal to about 1 mm, greater than or equal to about 2 mm, greater than or equal to about 4 mm, greater than or equal to about 6 mm, greater than or equal to about 8 mm, or greater than or equal to about 10 mm. Combinations of the above-referenced ranges are also possible. For instance, in certain embodiments, the average length of the glass fibers may be, for example, between about 0.1 mm and about 12 mm, or between about 0.1 mm and about 8 mm.

The weight percentage of glass fibers in a layer, such as a filtration layer, may vary. For instance, in some embodiments, the weight percentage of glass fibers in a layer may be greater than or equal to about 1%, greater than or equal to about 10%, greater than or equal to about 20%, greater than or equal to about 30%, greater than or equal to about 50%, greater than or equal to about 60%, greater than or equal to about 70%, greater than or equal to about 80%, or greater than or equal to about 85%. e.g., based on the total weight of fibers in a layer. In some instances, the weight percentage of glass fibers in a layer may be less than or equal to about 100%, less than or equal to about 90%, less than or equal to about 85%, less than or equal to about 80%, less than or equal to about 75%, less than or equal to about 70%, less than or equal to about 60%, less than or equal to about 50%, less than or equal to about 30%, less than or equal to about 20%, or less than or equal to about 15%, e.g., based on the total weight of fibers in a layer. Combinations of the above-referenced ranges are possible (e.g., a weight percentage greater than or equal to about 10% and less than or equal to about 90%, or greater than or equal to about 70% and less than or equal to about 90%). In some embodiments, the above weight percentages are based on the weight of the total dry solids of the layer (including any resins).

The filtration layer and/or filter media may also include a binder. The binder may comprises a small weight percentage of the filtration layer and/or filter media (e.g., between about 0 wt % and about 20 wt %). For example, the binder may comprise less than or equal to about 20 wt %, less than or equal to about 10 wt %, or less than or equal to about 5 wt % of the filtration layer and/or filter media. In some embodiments, the binder may comprises at least about 0.01 wt %, at least about 0.05 wt %, at least about 0.1 wt %, at least about 0.5 wt %, at least about 1 wt %, at least about 5 wt %, or at least about 10 wt % of the filtration layer and/or filter media. Combinations of the above-referenced ranges are also possible (e.g., between about 0 wt % and about 20 wt %, between about 0.02 wt % and about 5 wt %). As described further below, the binder may be added to the fibers in the wet fiber web state. In some embodiments, the binder coats the fibers and is used to adhere fibers to each other to facilitate adhesion between the fibers.

In general, the binder may have any suitable composition. In some embodiments, the binder is resin-based. For example, the binder may comprise an acrylic, an epoxy, a polyester, a phenol, or combinations thereof. Other resins are also possible.

In some embodiments, the binder may be in the form of a fiber, such as a bicomponent fiber. Each component of the bicomponent fiber can have a different melting temperature. For example, the fibers can include a core and a sheath where the melting temperature of the sheath is lower than the melting temperature of the core. This allows the sheath to melt prior to the core, such that the sheath binds to other fibers in the layer, while the core maintains its structural integrity. This is particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, and combinations thereof. Other exemplary bicomponent fibers can include split fiber fibers, side-by-side fibers, and/or "island in the sea" fibers.

The filtration layer and/or filter media may include any suitable amount of binder fibers. In some embodiments, the filtration layer and/or filter media includes less than or equal to about 30 wt %, less than or equal to about 20 wt %, less than or equal to about 10 wt %, or less than or equal to about 5 wt % binder fibers, e.g., based on the total weight of fibers in the layer or media. The filtration layer and/or filter media may include greater than or equal to about 1 wt %, greater than or equal to about 5 wt %, greater than or equal to about 10 wt %, or greater than or equal to about 20 wt %, e.g., based on the total weight of fibers in the layer or media. Combinations of the above-referenced ranges are possible (e.g., greater than or equal to about 1 wt % and less than or equal to about 10 wt %). In some embodiments, the above weight percentages are based on the weight of the total dry solids of the layer (including any resins).

It should be understood that not all filtration layers and/or filter media include all of the components described above. It should also be appreciated that other appropriate additives may be incorporated in some embodiments. For example, in addition to or alternatively to the binder, glass fibers, and/or polymeric fibers described above, a filtration layer and/or filter media may include a variety of other suitable additives (typically, in small weight percentages) such as, surfactants, coupling agents, crosslinking agents, amongst others.

The thickness of a filtration layer (e.g., a first, second or third layer) may be selected as desired. For instance, in some embodiments, the filtration layer may have a thickness of greater than or equal to about 0.1 mm, greater than or equal to about 0.2 mm, greater than or equal to about 0.4 mm, greater than or equal to about 0.5 mm, greater than or equal to about 0.8 mm, or greater than or equal to about 1.0 mm. In some instances, the filtration layer may have a thickness of less than or equal to about 5 mm, less than or equal to about 2 mm, less than or equal to about 1.2 mm, less than or equal to about 1.0, less than or equal to about 0.8 mm, less than or equal to about 0.5 mm, less than or equal to about 0.4 mm, or less than or equal to about 0.2 mm. Combinations of the above-referenced ranges are also possible (e.g., a thickness of greater than or equal to about 0.1 mm and less than or equal to about 1.2 mm, or a thickness of greater than or equal to about 0.3 mm and less than or equal to about 0.6 mm). Other values of thickness are also possible. As determined herein, the thickness is measured according to the standard ISO 534 at 2 N/cm$^2$. In some embodiments, a combination of filtration layers may have a combined thickness in one or more of the above-referenced ranges. Additionally, in embodiments in which more than one filtration layers are present in a media, each filtration layer may have a thickness having one or more of the above-referenced ranges. In certain embodiments, an overall filter media may include a thickness in one or more of the above-referenced ranges.

In some embodiments, a filtration layer (e.g., a first, second or third layer) may have a basis weight of less than or equal to about 400 g/m$^2$, less than or equal to about 350 g/m$^2$, less than or equal to about 300 g/m$^2$, less than or equal to about 250 g/m$^2$, less than or equal to about 200 g/m$^2$, less than or equal to about 150 g/m$^2$, less than or equal to about 100 g/m$^2$, or less than or equal to about 50 g/m$^2$. In some embodiments, the basis weight may be greater than or equal to about 30 g/m$^2$, greater than or equal to about 50 g/m$^2$, greater than or equal to about 100 g/m$^2$, greater than or equal to about 150 g/m$^2$, greater than or equal to about 200 g/m$^2$, greater than or equal to about 250 g/m$^2$, greater than or equal to about 300 g/m$^2$, or greater than or equal to about 350 g/m$^2$. Combinations of the above-referenced ranges are also possible (e.g., greater than or equal to about 30 g/m$^2$ and less than or equal to about 400 g/m$^2$, greater than or equal to about 50 g/m$^2$ and less than or equal to about 150 g/m$^2$). Other values of basis weight are also possible. As determined herein, the basis weight of the filter media is measured according to the standard ISO 536.

In some embodiments, a combination of filtration layers may have a combined basis weight in one or more of the above-referenced ranges. Additionally, in embodiments in which more than one filtration layers are present in a media, each filtration layer may have a basis weight having one or more of the above-referenced ranges. In certain embodiments, an overall filter media may include a basis weight in one or more of the above-referenced ranges.

In some embodiments, a filtration layer (e.g., a first, second or third layer) may have a dry tensile strength in the machine direction (MD) of greater than or equal to about 1.5 Newtons per 15 mm, greater than or equal to about 2 Newtons per 15 mm, greater than or equal to about 3 Newtons per 15 mm, greater than or equal to about 4 Newtons per 15 mm, greater than or equal to about 5 Newtons per 15 mm, greater than or equal to about 6 Newtons per 15 mm, greater than or equal to about 7 Newtons per 15 mm, or greater than or equal to about 8 Newtons per 15 mm. In some instances, the dry tensile strength in the machine direction may be less than or equal to about 10 Newtons per 15 mm, less than or equal to about 8 Newtons per 15 mm, less than or equal to about 7 Newtons per 15 mm, less than or equal to about 6 Newtons per 15 mm, less than or equal to about 5 Newtons per 15 mm, less than or equal to about 4 Newtons per 15 mm, less than or equal to about 3 Newtons per 15 mm, or less than or equal to about 2 Newtons per 15 mm. Combinations of the above-referenced ranges are also possible (e.g., greater than or equal to about 1.5 Newtons per 15 mm and less than or equal to about 10 Newtons per 15 mm, greater than or equal to about 3 Newtons per 15 mm to about 8 Newtons per 15 mm). Other values of dry tensile strength in the machine direction are also possible. As determined herein, the dry tensile strength in the machine direction is measured according to the standard EN/ISO 1924-4 using a jaw separation speed of 10 mm/min.

In certain embodiments, a filtration layer (e.g., a first, second or third layer) may have a dry tensile elongation at break in the machine direction of greater than or equal to about 0.3%, greater than or equal to about 0.5%, greater than or equal to about 0.7%, greater than or equal to about 1.0%, greater than or equal to about 2.0%, greater than or equal to about 3.0%, or greater than or equal to about 4.0%. In some instances, the dry tensile elongation at break in the machine direction may be less than or equal to about 5.0%, less than or equal to about 4.0%, less than or equal to about 3.0%, less than or equal to about 2.0%, less than or equal to about 1.5%, less than or equal to about 1.0%, or less than or equal to about 0.5%. Combinations of the above-referenced ranges are also possible (e.g., greater than or equal to about 0.3% and less than or equal to about 5.0%, greater than or equal to about 0.5% and less than or equal to about 2.0%). Other values of dry tensile elongation at break in the machine direction are also possible. As determined herein, the dry tensile elongation at break in the machine direction is measured according to the standard EN/ISO 1924-4 using a jaw separation speed of 10 mm/min.

In some embodiments, a combination of filtration layers may have a combined dry tensile strength in the machine direction and/or a dry tensile elongation in the machine direction in one or more of the above-referenced ranges. Additionally, in embodiments in which more than one filtration layers are present in a media, each filtration layer may have a dry tensile strength in the machine direction and/or a dry tensile elongation in the machine direction having one or more of the above-referenced ranges. In certain embodiments, an overall filter media may include a dry tensile strength in the machine direction and/or a dry tensile elongation in the machine direction in one or more of the above-referenced ranges.

A filtration layer (e.g., a first, second or third layer) described herein may also exhibit advantageous filtration performance characteristics, such as air permeability, dust holding capacity (DHC), efficiency, and mean flow pore size.

The air permeability of a filtration layer (e.g., a first, second or third layer) described herein can vary. In some embodiments, the permeability of the filtration layer may be, for example, greater than or equal to about 5 cfm/sf, greater than or equal to about 10 cfm/sf, greater than or equal to about 15 cfm/sf, greater than or equal to about 25 cfm/sf, greater than or equal to about 50 cfm/sf, greater than or equal to about 100 cfm/sf, greater than or equal to about 150 cfm/sf, greater than or equal to about 200 cfm/sf, greater than or equal to about 250 cfm/sf, greater than or equal to about 300, or greater than or equal to about 350 cfm/sf. In some instances, the air permeability may be, for example, less than or equal to about 400 cfm/sf, less than or equal to about 375 cfm/sf, less than or equal to about 350 cfm/sf, less than or equal to about 300 cfm/sf, less than or equal to about 250 cfm/sf, less than or equal to about 200 cfm/sf, less than or equal to about 150 cfm/sf, less than or equal to about 100 cfm/sf, less than or equal to about 50 cfm/sf, less than or equal to about 25 cfm/sf, less than or equal to about 20 cfm/sf, less than or equal to about 15 cfm/sf, or less than or equal to about 10 cfm/sf. Combinations of the above-referenced ranges are also possible. As determined herein, the permeability is measured according to standard TAPPI T251 (wherein the flow is 1ft$^3$/min at a 125 Pa differential pressure). The permeability of a filtration layer is an inverse function of flow resistance and can be measured with a Frazier Permeability Tester. The Frazier Permeability Tester measures the volume of air per unit of time that passes through a unit area of media at a fixed differential pressure across the media.

In some embodiments, a combination of filtration layers may have a combined air permeability in one or more of the above-referenced ranges. Additionally, in embodiments in which more than one filtration layers are present in a media, each filtration layer may have an air permeability having one or more of the above-referenced ranges. In certain embodiments, an overall filter media may include an air permeability in one or more of the above-referenced ranges.

The unit air of a filtration layer (e.g., a first, second or third layer) may vary. Unit air, as used herein, is the air permeability of a layer or media per basis weight of the layer or media (measured in (CFM/sf)/(g/m$^2$)). In general, the higher the value of the unit air for a layer or media, the lower the value of the pressure drop of the layer or media, indicating better performance. In some embodiments, the unit air of a filtration layer described herein may be, for example, greater than or equal to about 0.1 (CFM/sf)/(g/m$^2$), greater than or equal to about 0.20 (CFM/sf)/(g/m$^2$), greater than or equal to about 0.21 (CFM/sf)/(g/m$^2$), greater than or equal to about 0.22 (CFM/sf)/(g/m$^2$), greater than or equal to about 0.23 (CFM/sf)/(g/m$^2$), greater than or equal to about 0.25 (CFM/sf)/(g/m$^2$), greater than or equal to about 0.3 (CFM/sf)/(g/m$^2$), greater than or equal to about 0.35 (CFM/sf)/(g/m$^2$), greater than or equal to about 0.4 (CFM/sf)/(g/m$^2$), greater than or equal to about 0.5 (CFM/sf)/(g/m$^2$), greater than or equal to about 1.0 (CFM/sf)/(g/m$^2$), greater than or equal to about 1.5 (CFM/sf)/(g/m$^2$), greater than or equal to about 2.0 (CFM/sf)/(g/m$^2$), greater than or equal to about 3.0 (CFM/sf)/(g/m$^2$), greater than or equal to about 5.0 (CFM/sf)/(g/m$^2$), or greater than or equal to about 7.0 (CFM/sf)/(g/m$^2$). The unit air of the filtration layer may be, for example, less than or equal to about 10.0 (CFM/sf)/(g/m$^2$), less than or equal to about 8.0 (CFM/sf)/(g/m$^2$), less than or equal to about 6.0 (CFM/sf)/(g/m$^2$), less than or equal to about 4.0 (CFM/sf)/(g/m$^2$), less than or equal to about 3.0 (CFM/sf)/(g/m$^2$), less than or equal to about 2.0 (CFM/sf)/(g/m$^2$), less than or equal to about 1.0 (CFM/sf)/(g/m$^2$), less than or equal to about 0.5 (CFM/sf)/(g/m$^2$), or less than or equal to about 0.3 (CFM/sf)/(g/m$^2$). Combinations of the above-referenced ranges are also possible. In some embodiments, a combination of filtration layers may have a combined unit air in one or more of the above-referenced ranges. Additionally, in embodiments in which more than one filtration layers are present in a media, each filtration layer may have an unit air having one or more of the above-referenced ranges. In certain embodiments, an overall filter media may include an unit air in one or more of the above-referenced ranges.

The dust holding capacity (DHC) of a filtration layer (e.g., a first, second or third layer) may vary. For example, a filtration layer can have an overall dust holding capacity of at least about 50 g/m$^2$, at least about 80 g/m$^2$, at least about 100 g/m$^2$, at least about 125 g/m$^2$, at least about 150 g/m$^2$, at least about 160 g/m$^2$, at least about 180 g/m$^2$, at least about 200 g/m$^2$, at least about 220 g/m$^2$, at least about 240 g/m$^2$, at least about 260 g/m$^2$, or at least about 280 g/m$^2$. The dust holding capacity may be, for example, less than or equal to about 300 g/m$^2$, less than or equal to about 280 g/m$^2$, less than or equal to about 260 g/m$^2$, less than or equal to about 240 g/m$^2$, less than or equal to about 220 g/m$^2$, less than or equal to about 200 g/m$^2$, less than or equal to about 180 g/m$^2$, less than or equal to about 160 g/m$^2$, less than or equal to about 150 g/m$^2$, less than or equal to about 125 g/m$^2$, less than or equal to about 100 g/m$^2$, or less than or equal to about 80 g/m$^2$. The dust holding capacity, as referred to herein, is tested based on a Multipass Filter Test following the ISO 16889 procedure (modified by testing a flat sheet sample) on a Multipass Filter Test Stand manufactured by FTI. The testing uses ISO A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test was run at a face velocity of 0.67 cm/s until a terminal pressure of 500 kPa above the baseline filter pressure drop is obtained.

In some embodiments, a combination of filtration layers may have a combined DHC in one or more of the above-referenced ranges. Additionally, in embodiments in which more than one filtration layers are present in a media, each filtration layer may have a DHC having one or more of the above-referenced ranges. In certain embodiments, these performance characteristics are achieved with a filtration layer including a blend of polymeric fibers comprising at least partially embedded charged particles and glass fibers. In certain embodiments, an overall filter media may include a DHC in one or more of the above-referenced ranges, or a higher range when a pre-filter layer is present in the media.

In some embodiments, a filtration layer (e.g., a first, second or third layer), and/or an overall filter media may have a mean flow pore size of greater than or equal to about 3 micron, greater than or equal to about 4 microns, greater than or equal to about 5 microns, greater than or equal to about 7 microns, greater than or equal to about 9 microns, greater than or equal to about 10 microns, greater than or equal to about 15 microns, greater than or equal to about 20 microns, or greater than or equal to about 25 microns. In some instances, a filtration layer and/or the overall filter media may have a mean flow pore size of less than or equal to about 30 microns, less than or equal to about 25 microns, less than or equal to about 20 microns, less than or equal to about 15 microns, less than or equal to about 10 microns, less than or equal to about 9 microns, less than or equal to about 7 microns, less than or equal to about 5 microns, or less than or equal to about 4 microns. Combinations of the above-referenced ranges are also possible (e.g., greater than or equal to about 3 microns and less than or equal to about 30 microns, greater than or equal to about 5 micron and less than or equal to about 20 microns). As used herein, the mean flow pore size refers to the mean flow pore size measured as determined according to the standard ASTM E1294 (2008) (M.F.P.).

In some embodiments, a combination of filtration layers may have a combined mean flow pore size in one or more of the above-referenced ranges. Additionally, in embodiments in which more than one filtration layers are present in a media, each filtration layer may have a mean flow pore size having one or more of the above-referenced ranges.

As used herein, the efficiency (including beta efficiency) of a layer or an entire filter media is measured using a Multipass Filter Test following the ISO 16889 procedure (modified by testing a flat sheet sample), e.g., using a Multipass Filter Test Stand manufactured by FTI. The testing uses ISO A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test can be run at a face velocity of 0.67 cm/s until a terminal pressure of 500 kPa. Particle counts (particles per milliliter) at the particle sized selected (e.g., 1, 3, 4, 5, 7, 10, 15, 20, 25, or 30 microns) upstream and downstream of the media can be taken at ten points equally divided over the time of the test. The average of upstream and downstream particle counts can be taken at each selected particle size.

The layers or overall filter media described herein may be designed to have a particular average efficiency, or to be within a particular range of average efficiencies. In some embodiments, a layer of the filter media (e.g., a first, second or third layer, such as a filtration layer), and/or the overall filter media may have an average efficiency for 1 micron or larger particles of greater than or equal to about 30%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, greater than or equal to about 90%, greater than or equal to about 95%, greater than or equal to about 98%, or greater than or equal to about 99%. Other efficiencies are also possible. In some embodiments, a layer of the filter media (e.g., a first, second or third layer, such as a filtration layer), and/or the overall filter media has an average efficiency of less than or equal to 99.9%, less than or equal to 99.8%, less than or equal to 99.7%, less than or equal to 99.5%, less than or equal to 99%, less than or equal to 98%, less than or equal to 95%, less than or equal to 90%, less than or equal to 85%, less than or equal to 80%, less than or equal to 70%, less than or equal to 60%, or less than or equal to 50% for 1 micron or larger particles. In some embodiments, a combination of layers may have an average efficiency in one or more of the above-referenced ranges.

Efficiency can also be expressed in terms of a beta value (e.g., beta 200), where Beta(x)=y is the ratio of the upstream average particle count ($C_0$) to the downstream average particle count (C), and where x is the minimum particle size that will achieve the actual ratio of $C_0$ to C that is equal to y. The efficiency of the media is 100 times the efficiency fraction, and the efficiency percentage is $100*(1-1/beta(x))$. A filter media having a beta(x)=200 has an efficiency of $[1-(1/200)]*100$, or 99.5% for x micron or greater particles. Various values of minimum particle size x can be achieved for beta values described herein (e.g., beta 200).

The efficiency of a layer or media can also be expressed in terms of a micron rating for beta efficiency. In some embodiments, a layer of the filter media (e.g., a first, second or third layer, such as a filtration layer), and/or the overall filter media may have a relatively low micron rating for beta efficiency (e.g., beta 200); that is, the minimum particle size for achieving a particular efficiency (e.g., a beta 200 efficiency or an efficiency of 99.5%) may be relatively low. For instance, in some instances, the micron rating for beta efficiency (e.g., beta 200) may be less than or equal to about 30 microns, less than or equal to about 28 microns, less than or equal to about 25 microns, less than or equal to about 24 microns, less than or equal to about 22 microns, less than or equal to about 20 microns, less than or equal to about 18 microns, less than or equal to about 16 microns, less than or equal to about 14 microns, less than or equal to about 12 microns, less than or equal to about 10 microns, less than or equal to about 8 microns, or less than or equal to about 5 microns. In some embodiments, the micron rating for beta efficiency (e.g., beta 200) may be greater than or equal to about 4 microns, greater than or equal to about 5 microns, greater than or equal to about 6 microns, greater than or equal to about 8 microns, greater than or equal to about 10 microns, greater than or equal to about 12 microns, greater than or equal to about 15 microns, greater than or equal to about 20 microns, or greater than or equal to about 25 microns. Combinations of the above-referenced ranges are possible (e.g., greater than or equal to about 4 microns and less than or equal to about 30 microns, greater than or equal to about 5 microns and less than or equal to about 25 microns).

In some embodiments, a combination of filtration layers may have a combined efficiency in one or more of the above-referenced ranges. Additionally, in embodiments in which more than one filtration layers are present in a media, each filtration layer may have a efficiency having one or more of the above-referenced ranges. In certain embodiments, an overall filter media may include a efficiency in one or more of the above-referenced ranges. In certain embodiments, these performance characteristics are achieved with a filter media including a layer comprising a blend of polymeric fibers comprising at least partially embedded charged particles and glass fibers.

The performance of a layer or filter media can be expressed in terms of a hydraulic gamma value (γ). Hydraulic gamma can be determined as a function of the air permeability ("air perm", in units of cfm/sf) and the minimum particle size that will achieve a beta 200 efficiency value (β200) by the formula, $\gamma=(10*(air\ perm)^{0.77}/\beta 200)$. For example, if the air perm is 19 cfm/sf and the Beta (x)=200 value is 5 microns, then the hydraulic gamma is 19. In some embodiments, a layer of the filter media (e.g., a first, second or third layer, such as a filtration layer), and/or the overall filter media may have a relatively high hydraulic gamma. For instance, a layer of the filter media and/or the overall filter media may have a hydraulic gamma of greater than or equal to about 8, greater than or equal to about 10, greater than or equal to about 12, greater than or equal to about 14, greater than or equal to about 15, greater than or equal to about 17, greater than or equal to about 19, greater than or equal to about 20, or greater than or equal to about 21. In some instances, a layer of the filter media may have hydraulic gamma of less than or equal to about 22, less than or equal to about 21, less than or equal to about 20, less than or equal to about 19, less than or equal to about 17, less than or equal to about 15 microns, less than or equal to about 14, less than or equal to about 12, or less than or equal to about 10. Combinations of the above-referenced ranges are also possible (e.g., greater than or equal to about 8 microns and less than or equal to about 22 microns, greater than or equal to about 10 micron and less than or equal to about 17 microns).

In some embodiments, a combination of filtration layers may have a combined hydraulic gamma in one or more of the above-referenced ranges. Additionally, in embodiments in which more than one filtration layers are present in a media, each filtration layer may have a hydraulic gamma having one or more of the above-referenced ranges.

As described herein, in some embodiments, a layer (e.g., the first layer, and optionally the third layer), may be a pre-filter layer. In some such embodiments, the pre-filter layer(s) may be wet-laid (e.g., formed of a wet-laid process). In other embodiments, the pre-filter layer(s) may be non-wet laid (e.g., formed of a non-wet laid process such as a dry laid, meltblown, melt spinning, centrifugal spinning, electrospinning, spunbond, or air laid process).

In some embodiments, the pre-filter layer includes polymeric fibers. Additionally or alternatively, a pre-filter layer may include glass fibers, such as the glass fibers described herein for a filtration layer. In some embodiments, the pre-filter may include a carded web and/or other layers (e.g., a glass fiber layer, a meltblown fiber layer) disposed adjacent (e.g., directly adjacent and/or downstream) to the carded web. It should be understood that the filter media may have any suitable number of pre-filter layers (e.g., at least 1, at least 2, at least 3, at least 4, at least 6, at least 8, at least 10 pre-filter layers).

Generally, a pre-filter layer may be formed using coarser fibers, with a relatively open pore structure, and therefore has a lower resistance to fluid flow, than that of a main filtration layer. In some embodiments, a pre-filter of a filter media may have one or more layers.

In certain embodiments, one or more layers of a pre-filter may have an average fiber diameter of between about 0.6 to about 40 microns, a basis weight of between about 5 g/m² to about 450 g/m², a mean flow pore size of between about 4 microns to about 100 microns (e.g., between about 5 microns to about 90 microns or between about 10 microns to about 50 microns), and an air permeability of between about 10 cfm/sf to about 800 cfm/sf. Other configurations and ranges of values are also possible, as described in more detail herein.

In general, the pre-filter layer(s) may be formed from any suitable fibers (e.g., meltblown fibers, polymeric fibers, cellulose fibers, lyocell fibers, glass fibers, combinations thereof, etc.). Regardless of the fiber type, the average diameter of the fibers in a pre-filter layer may be, for example, greater than or equal to about 0.6 microns, greater than or equal to about 1 micron, greater than or equal to about 5 microns, greater than or equal to about 10 microns, greater than or equal to about 15 microns, greater than or equal to about 20 microns, greater than or equal to about 25 microns, greater than or equal to about 30 microns, or greater than or equal to about 35 microns. In some embodiments, the average diameter of the fibers in the pre-filter layer(s) may be, for example, less than or equal to about 40 microns, less than or equal to about 35 microns, less than or equal to about 30 microns, less than or equal to about 25 microns, less than or equal to about 20 microns, less than or equal to about 15 microns, less than or equal to about 10 microns, less than or equal to about 5 microns, less than or equal to about 3 microns, or less than or equal to about 2 microns. Combinations of the above-referenced ranges are also possible (e.g., between 0.6 micron and 40 microns, between 0.6 microns and 35 microns, between 1 micron and 20 microns).

In some embodiments, regardless of the fiber content, the basis weight of one or more pre-filter layers, or the entire pre-filter, may be greater than or equal to about 5 g/m², greater than or equal to about 10 g/m², greater than or equal to about 25 g/m², greater than or equal to about 50 g/m², greater than or equal to about 100 g/m², greater than or equal to about 150 g/m², greater than or equal to about 200 g/m², greater than or equal to about 250 g/m², greater than or equal to about 300 g/m², greater than or equal to about 350 g/m², greater than or equal to about 400 g/m², or greater than or equal to about 450 g/m². In some instances, the basis weight of one or more pre-filter layers, or the entire pre-filter, may be less than or equal to about 500 g/m², less than or equal to about 450 g/m², less than or equal to about 400 g/m², less than or equal to about 350 g/m², less than or equal to about 300 g/m², less than or equal to about 250 g/m², less than or equal to about 200 g/m², less than or equal to about 150 g/m², less than or equal to about 100 g/m², or less than or equal to about 50 g/m². Combinations of the above-referenced ranges are also possible (e.g., greater than or equal to about 5 g/m² and less than or equal to about 500 g/m², greater than or equal to about 10 g/m² and less than or equal to about 400 g/m²). Other values of basis weight are also possible for various types of pre-filters described herein.

In some embodiments, a combination of pre-filter layers may have a combined basis weight in one or more of the above-referenced ranges. Additionally, in embodiments in which more than one pre-filter layers are present in a media, each pre-filter layer may have a basis weight having one or more of the above-referenced ranges.

In some embodiments, the dust holding capacity of one or more pre-filter layers, or a combination of pre-filter layers (e.g., an entire pre-filter), may be greater than or equal to about 20 g/m², greater than or equal to about 50 g/m², greater than or equal to about 80 g/m², greater than or equal to about 100 g/m², greater than or equal to about 125 g/m², greater than or equal to about 150 g/m², greater than or equal to about 175 g/m², greater than or equal to about 200 g/m², greater than or equal to about 225 g/m², greater than or equal to about 250 g/m², greater than or equal to about 275 g/m², or greater than or equal to about 300 g/m². In some instances, the dust holding capacity may be less than or equal to about 350 g/m², less than or equal to about 325 g/m², less than or equal to about 300 g/m², less than or equal to about 275 g/m², less than or equal to about 250 g/m², less than or equal to about 225 g/m², less than or equal to about 200 g/m², less than or equal to about 180 g/m², less than or equal to about 150 g/m², less than or equal to about 125 g/m², less than or equal to about 100 g/m², or less than or equal to about 75 g/m². Combinations of the above-referenced ranges are also possible (e.g., a dust holding capacity of greater than about 20 g/m² and less than or equal to about 300 g/m², a dust holding capacity of greater than about 50 g/m² and less than or equal to about 300 g/m²). Other values of dust holding capacity for various types of pre-filters are also possible.

In some embodiments, one or more pre-filter layers, or the entire pre-filter, may have a micron rating for beta efficiency (e.g., beta 200) of greater than or equal to about 4 microns, greater than or equal to 5 microns, greater than or equal to about 6 microns, greater than or equal to about 8 microns, greater than or equal to about 10 microns, greater than or equal to about 12 microns, greater than or equal to about 15 microns, greater than or equal to about 20 microns, or greater than or equal to about 25 microns. In some instances, the micron rating for beta efficiency (e.g., beta 200) of the one or more pre-filter layers, or the entire pre-filter, may be less than or equal to about 30 microns, less than or equal to about 28 microns, less than or equal to about 25 microns, less than or equal to about 24 microns, less than or equal to about 22 microns, less than or equal to about 20 microns, less than or equal to about 18 microns, less than or equal to about 16 microns, less than or equal to about 14 microns, less than or equal to about 12 microns, less than or equal to about 10 microns, or less than or equal to about 8 microns. For various types of pre-filters, combinations of the above-referenced ranges are possible (e.g., greater than or equal to about 4 microns and less than or equal to about 30 microns).

In some embodiments, one or more pre-filter layers, or the entire pre-filter, in accordance with the present disclosure may have a mean flow pore size of greater than or equal to about 3 microns, greater than or equal to about 4 microns, greater than or equal to about 5 microns, greater than or equal to about 6 microns, greater than or equal to about 10 microns, greater than or equal to about 20 microns, greater than or equal to about 30 microns, greater than or equal to about 40 microns, greater than or equal to about 50 microns, greater than or equal to about 65 microns, or greater than or equal to about 80 microns. In some instances, one or more pre-filter layers, or the entire pre-filter, may have a mean flow pore size of less than or equal to about 100 microns, less than or equal to about 90 microns, less than or equal to about 80 microns, less than or equal to about 70 microns, less than or equal to about 60 microns, less than or equal to about 50 microns, less than or equal to about 40 microns, less than or equal to about 25 microns, less than or equal to about 10 microns, or less than or equal to about 5 microns. Combinations of the above-referenced ranges are also possible (e.g., greater than or equal to about 4 microns and less than or equal to about 100 microns, greater than or equal to about 5 microns and less than or equal to about 90 microns).

The air permeability of one or more pre-filter layers, or the entire pre-filter, as described herein can also be varied as desired. For instance, in some embodiments, one or more pre-filter layers, or a combination of pre-filter layers (e.g., an entire pre-filter), may have an air permeability of greater than or equal to about 10 cfm/sf, greater than or equal to about 25 cfm/sf, greater than or equal to about 30 cfm/sf, greater than or equal to about 40 cfm/sf, greater than or equal to about 50 cfm/sf, greater than or equal to about 100 cfm/sf, greater than or equal to about 150 cfm/sf, greater than or equal to about 200 cfm/sf, greater than or equal to about 250 cfm/sf, greater than or equal to about 300 cfm/sf, greater than or equal to about 350 cfm/sf, greater than or equal to about 400 cfm/sf, greater than or equal to about 500 cfm/sf, greater than or equal to about 600 cfm/sf, or greater than or equal to about 700 cfm/sf. In some instances, one or more pre-filter layers, or a combination of pre-filter layers (e.g., an entire dual-layer pre-filter), may have an air permeability of less than or equal to about 800 cfm/sf, less than or equal to about 700 cfm/sf, less than or equal to about 600 cfm/sf, less than or equal to about 500 cfm/sf, less than or equal to about 400 cfm/sf, less than or equal to about 375 cfm/sf, less than or equal to about 350 cfm/sf, less than or equal to about 325 cfm/sf, less than or equal to about 300 cfm/sf, less than or equal to about 275 cfm/sf, less than or equal to about 250 cfm/sf, less than or equal to about 225 cfm/sf, less than or equal to about 200 cfm/sf, less than or equal to about 175 cfm/sf, less than or equal to about 150 cfm/sf, less than or equal to about 125 cfm/sf, less than or equal to about 100 cfm/sf, less than or equal to about 75 cfm/sf, or less than or equal to about 50 cfm/sf. Combinations of the above-referenced ranges are also possible (e.g., greater than or equal to about 10 cfm/sf and less than or equal to about 800 cfm/sf, greater than or equal to about 10 cfm/sf and less than or equal to about 400 cfm/sf, greater than or equal to about 30 cfm/sf and less than or equal to about 350 cfm/sf).

As noted above, the pre-filter may include layers made up of one or more suitable fiber types. In certain embodiments, one or more layers of the pre-filter includes glass fibers. The weight percentage of glass fibers in a pre-filter layer may vary. In some embodiments, the weight percentage of glass fibers in a pre-filter layer may be greater than or equal to about 1%, greater than or equal to about 10%, greater than or equal to about 20%, greater than or equal to about 30%, greater than or equal to about 50%, greater than or equal to about 60%, greater than or equal to about 70%, greater than or equal to about 80%, greater than or equal to about 90%, or greater than or equal to about 95%, e.g., based on the total amount weight of fibers in a pre-filter layer. In some instances, the weight percentage of glass fibers in a pre-filter layer may be less than or equal to about 100%, less than or equal to about 90%, less than or equal to about 85%, less than or equal to about 80%, less than or equal to about 75%, less than or equal to about 70%, less than or equal to about 60%, less than or equal to about 50%, less than or equal to about 30%, less than or equal to about 20%, or less than or equal to about 15%, e.g., based on the total amount weight of fibers in a pre-filter layer. Combinations of the above-referenced ranges are possible (e.g., a weight percentage greater than or equal to about 50% and less than or equal to about 100%, or greater than or equal to about 80% and less than or equal to about 100%). In some embodiments, a pre-filter layer includes 0 wt % glass fibers. In other embodiments, a pre-filter layer includes 100 wt % glass fibers. In some embodiments, the above weight percentages are based on the weight of the total dry solids of the pre-filter layer(s) (including any resins). In some embodiments, a combination of pre-filter layers may have a combined weight percentage of glass fibers in one or more of the above-referenced ranges. Additionally, in embodiments in which more than one pre-filter layers are present in a media, each pre-filter layer may have a weight percentage of glass fibers in one or more of the above-referenced ranges.

In certain embodiments, one or more layers of the pre-filter includes polymeric fibers. The polymeric fibers in a pre-filter layer may be formed of one or more polymeric materials described above for the filtration layer. For instance, the polymeric fiber may be a synthetic polymeric fiber. In other instances, non-synthetic polymers such as natural materials (e.g., natural polymers such as cellulose (e.g., wood, cotton, or other non-regenerated cellulose) can be used.

One or more layers of the pre-filter may include a suitable percentage of polymeric fibers (e.g., synthetic and/or non-synthetic polymer fibers). The weight percentage of polymeric fibers in one or more pre-filter layers may be, for example, greater than or equal to about 1%, greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 80%, or greater than or equal to about 90% based on the total weight of fibers in a layer. In some instances, the weight percentage of polymeric fibers may be less than or equal to about 100%, less than or equal to about 90%, less than or equal to about 85%, less than or equal to about 80%, less than or equal to about 75%, less than or equal to about 70%, less than or equal to about 60%, less than or equal to about 50%, less than or equal to about 30%, less than or equal to about 20%, or less than or equal to about 15% based on the total weight of fibers in the layer. Combinations of the above-referenced ranges are possible. In some embodiments, a pre-filter layer includes 0 wt % polymeric fibers. In other embodiments, a pre-filter layer includes 100 wt % polymeric fibers. In some embodiments, the above weight percentages are based on the weight of the total dry solids of the pre-filter layer(s) (including any resins).

In some embodiments, a combination of pre-filter layers may have a combined weight percentage of polymeric fibers in one or more of the above-referenced ranges. Additionally, in embodiments in which more than one pre-filter layers are present in a media, each pre-filter layer may have a weight percentage of polymeric fibers in one or more of the above-referenced ranges.

In some embodiments, the pre-filter layer(s), or other layers of the filter media (e.g., the filtration layer), may include multiple types of polymeric fibers, or specifically, multiple types of synthetic fibers. For example, synthetic fibers may include staple fibers that are cut to a suitable average length and are appropriate for incorporation into a wet-laid or non-wet-laid process for forming a filter media. In some cases, groups of staple fibers may be cut to have a particular length with only slight variations in length between individual fibers. In some particular embodiments, the synthetic fibers may be binder fibers, as described herein.

As discussed above, the pre-filter of the filter media may have a single layer or multiple layers. In some embodiments, the pre-filter of the filter media includes a clear demarcation between layers. For example, the pre-filter may include an interface between two layers that is distinct. In some such embodiments, the layers may be formed separately, and combined by any suitable method such as lamination, collation, or by use of adhesives.

In other embodiments, the pre-filter of the filter media does not include a clear demarcation between layers. For example, a distinct interface between two layers may not be apparent. In some cases, the layers forming a pre-filter may be indistinguishable from one another across the thickness of the pre-filter. The layers may be formed by the same process (e.g., a wet laid process, a non-wet-laid process (a melt spinning process, a centrifugal spinning process, an electrospinning process, a meltblown process), or any other suitable process) or by different processes. In some instances, adjacent layers (e.g., directly adjacent layers) may be formed simultaneously.

Additionally, it should be appreciated that a clear demarcation may be present between a main filtration layer and a pre-filter layer in some embodiments; however, in other embodiments, a clear demarcation is not present between a main filtration layer and a pre-filter layer.

Regardless of whether a clear demarcation between layers is present, in some embodiments, the pre-filter, or other layer(s) (e.g., a main filtration layer), of the filter media includes a gradient (i.e., a change) in one or more properties such as fiber diameter, fiber type, fiber composition, fiber length, fiber surface chemistry, particle size, particle surface area, particle composition, pore size, material density, basis weight, solidity, a proportion of a component (e.g., a binder, resin, crosslinker), stiffness, tensile strength, wicking ability, hydrophilicity/hydrophobicity, and conductivity across a portion, or all of, the thickness of the filter media. The pre-filter, or other layer(s) of the filter media, may optionally include a gradient in one or more performance characteristics such as efficiency, dust holding capacity, pressure drop, air permeability, and porosity across the thickness of the pre-filter. A gradient in one or more such properties may be present in the pre-filter, or other layer(s) of the filter media, between a top surface and a bottom surface thereof. In the portions of the pre-filter, or other layer(s), where a gradient in the property is not apparent, the property may be substantially constant through that portion of the pre-filter. As described herein, in some instances a gradient in a property involves different proportions of a component (e.g., a type of fiber, an additive, a binder) across the thickness. In some embodiments, a component may be present at an amount or a concentration that is different than another portion of the filter media. Other configurations are also possible.

In one particular set of embodiments, a pre-filter of a filter media comprises one or more layers comprising polymeric fibers (e.g., polymeric staple fibers having an average length of less than or equal to about 5 mm) having an average fiber diameter of less than or equal to about 20 microns (e.g., less than or equal to about 10 microns).

In embodiments in which polymeric staple fibers are present in a pre-filter layer, the polymeric staple fibers may have an average diameter of less than or equal to about 20 microns, less than or equal to about 15 microns, less than or equal to about 10.5 microns, less than or equal to about 10 microns, less than or equal to about 8 microns, less than or equal to about 6 microns, less than or equal to about 4 microns, less than or equal to about 3 microns, less than or equal to about 2 microns, less than or equal to about 1 micron, less than or equal to about 0.9 microns, or less than or equal to about 0.8 microns. In some instances, the average fiber diameter of the polymeric stable fibers within a pre-filter layer may be greater than or equal to about 0.6 microns, greater than or equal to about 1 micron, greater than or equal to about 2 microns, greater than or equal to about 4 microns, greater than or equal to about 6 microns, or greater than or equal to about 8 microns. Combinations of the above-referenced ranges are also possible.

Generally, the polymeric staple fibers are non-continuous fibers. That is, the polymeric staple fibers are generally cut (e.g., from a filament) or formed as non-continuous discrete fibers to have a particular length or a range of lengths. In some embodiments, the polymeric staple fibers may have a length of less than or equal to about 55 mm, less than or equal to about 40 mm, less than or equal to about 20 mm, less than or equal to about 10 mm, less than or equal to about 5 mm, less than or equal to about 3 mm, less than or equal to about 2 mm, less than or equal to about 1 mm, less than or equal to about 0.75 mm, less than or equal to about 0.5 mm, less than or equal to about 0.2 mm, or less than or equal to about 0.1 mm. In some instances, the polymeric staple fibers may have a length of greater than or equal to about 0.02 mm, greater than or equal to about 0.03 mm, greater than or equal to about 0.05 mm, greater than or equal to about 0.1 mm, greater than or equal to about 0.2 mm, greater than or equal to about 0.5 mm, greater than or equal to about 0.75 mm, greater than or equal to about 1 mm, greater than or equal to about 5 mm, greater than or equal to about 10 mm, greater than or equal to about 20 mm, or greater than or equal to about 40 mm. Combinations of the above-referenced ranges are possible (e.g., greater than or equal to about 0.02 mm and less than or equal to about 55 mm, greater than or equal to about 0.03 mm and less than or equal to about 55 mm).

The weight percentage of polymeric staple fibers in a pre-filter layer may vary. As described herein, such a layer may include a blend of the polymeric staple fibers with glass fibers. For instance, in some embodiments, the weight percentage of polymeric staple fibers in a pre-filter layer may be greater than or equal to about 0.5%, greater than or equal to about 1%, greater than or equal to about 3%, greater than or equal to about 5%, greater than or equal to about 8%, greater than or equal to about 10%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, greater than or equal to about 60%, greater than or equal to about 70%, or greater than or equal to about 80%, e.g., based on the total amount of fibers in the layer. In some instances, the weight percentage of polymeric staple fibers in the pre-filter layer may be less than or equal to about 99.5%, less than or equal to about 99%, less than or equal to about 98%, less than or equal to about 96%, less than or equal to about 92%, less than or equal to about 90%, less than or equal to about 85%, less than or equal to about 80%, less than or equal to about 75%, less than or equal to about 70%, less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, less than or equal to about 15%, less than or equal to about 10%, or less than or equal to about 5%, e.g., based on the total amount of fibers in the layer. Combinations of the above-referenced ranges are possible (e.g., greater than or equal to about 1% and less than or equal to about 99%, or greater than or equal to about 5% and less than or equal to about 96%). In some embodiments, the above weight percentages are based on the weight of the total dry solids of the layer (including any resins).

In certain embodiments, one or more layers of the pre-filter includes a mixture of fibrillated fibers with polymeric fibers (e.g., polymeric staple fibers) and/or glass fibers, amongst other optional components (e.g., binder resin). A fibrillated fiber may be formed of any suitable materials such as synthetic materials (e.g., synthetic polymeric fibers), such as those described herein. In other instances, non-synthetic polymers may be used, such as those described herein. In certain embodiments, the fibrillated fibers are formed of lyocell (a type of synthetic fiber and may be produced from regenerated cellulose by solvent spinning).

One or more pre-filter layers may include any suitable weight percentage of fibrillated fibers. In some embodiments, the weight percentage of the fibrillated fibers in the pre-filter layer is about 1 weight % or greater, about 2.5 weight % or greater, about 5 weight % or greater, about 10 weight % or greater, about 15 weight % or greater, or about 20 weight % or greater. In some embodiments, the weight percentage of the fibrillated fibers in the pre-filter layer is about 60 weight % or less, about 50 weight % or less, about 30 weight % or less, or about 21 weight % or less. It should be understood that the weight percentage of fibrillated fibers in the pre-filter layer may be between any of the above-noted lower limits and upper limits. Other ranges are also possible.

In general, the fibrillated fibers may include any suitable level of fibrillation (i.e., the extent of branching in the fiber). The level of fibrillation may be measured according to any number of suitable methods. For example, the level of fibrillation of the fibrillated fibers can be measured according to a Canadian Standard Freeness (CSF) test, specified by TAPPI test method T 227 om 09 Freeness of pulp. The test can provide an average CSF value.

In certain embodiments, the average CSF value of the fibrillated fibers used in one or more pre-filter layers of the filter media may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 110 mL, greater than or equal to about 120 mL, greater than or equal to about 130 mL, greater than or equal to about 140 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 400 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in one or more pre-filter layers of the filter media may be less than or equal to about 800 mL, less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 140 mL, less than or equal to about 130 mL, less than or equal to about 120 mL, less than or equal to about 110 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced lower limits and upper limits are also possible. It should be understood that, in certain embodiments, the fibers may have fibrillation levels outside the above-noted ranges. The average CSF value of the fibrillated fibers used in the layer(s) may be based on one type of fibrillated fiber or more than one type fibrillated fiber.

The filter media described herein can also have other configurations of first, second, and optionally third or more layers. For instance, in some cases filter media 10 of FIG. 1 does not include a pre-filter layer. In some such embodiments, the first layer (e.g., layer 25) is an upstream filtration layer and second layer (e.g., layer 35) is a filtration layer downstream of the first layer. Optionally, the filter media can include a third layer 45 (e.g., another filtration layer) positioned downstream of the second layer or a third layer 45 (e.g., another filtration layer) positioned upstream of the first layer. In some embodiments, an upstream layer may have coarser fibers, and therefore a lower resistance to fluid flow, than that of a layer downstream of that layer. In some cases, the resistance of each layer increases successively from the furthest upstream layer to the furthest downstream layer.

In some embodiments, a layer having relatively coarse fibers may be positioned between two layers having relatively finer fibers. Other configurations are also possible. Additionally, a filter media may include any suitable number of layers, e.g., at least 2, 3, 4, 5, 6, 7, 8, or 9 layers (e.g., up to 10 layers), depending on the particular application and performance characteristics desired.

As noted above, each of the layers of the filter media can have different properties. For instance, the first and second layers can include fibers having different characteristics (e.g., fiber diameters, fiber compositions, and/or fiber lengths). Fibers with different characteristics can be made from one material (e.g., by using different process conditions) or different materials (e.g., glass fibers, polymeric fibers (e.g., organic polymer fibers), and combinations thereof).

In some embodiments, a filter media described herein may comprise a pre-filter including one or more layers (e.g., a first layer and/or a third layer) and a filtration layer (e.g., a second layer) comprising glass fibers and polymeric fibers (e.g., polymeric fibers including charged particles as described herein). The filtration layer and/or pre-filter layer(s) may optionally be formed on a scrim or supporting layer. The filter media may be arranged such that the filtration layer (e.g., second layer) is positioned downstream of the one or more pre-filter layers. In one set of embodiments, the one or more pre-filter layers may be wet-laid layer(s) (e.g., a layer formed by a wet laid process). For example, the wet-laid layer(s) may include non-continuous fibers such as glass fibers and certain polymeric fibers as described herein. In one specific embodiment, a dual-layer glass pre-filter may be used (optionally including some polymeric fibers). In another set of embodiments, the one or more pre-filter layers may be non-wet laid layer(s) (e.g., it may include meltblown fibers, meltspun fibers, centrifugal spun fibers, air-laid fibers, dry-laid fibers, or fibers formed by other non-wet laid processes). For instance, a pre-filter layer may comprise a layer of continuous fibers (e.g., meltblown fibers, meltspun fibers, centrifugal spun fibers). In some instances, the layer of continuous fibers may be manufactured and adhered to another layer (e.g., a scrim, a multi-layered filter media, a single phase layer, a multiphase layer) in any appropriate manner. A layer including continuous fibers may be positioned downstream or upstream with respect to the layer on which it is adhered.

A filter media and/or a layer of the filter media (e.g., a filtration layer, a pre-filter layer) described herein may be produced using any suitable processes, such as using a wet laid process (e.g., a process involving a pressure former, a rotoformer, a fourdrinier, a hybrid former, or a twin wire process) or a non-wet laid process (e.g., a dry laid process, an air laid process, a meltblown process, an electrospinning process, a centrifugal spinning process, or a carding process). In some embodiments, the filter media and/or a layer of the filter media is formed using a process that results in a non-woven web. In other embodiments, the filter media and/or a layer of the filter media may be woven. Generally, fibers in a non-woven web are randomly entangled together, whereas fibers in a woven web are ordered.

The filter media and/or a layer of the filter media described herein may be produced using processes based on known techniques. In some cases, one or more layers of the filter media is produced using a wet laid process. In general, a wet laid process involves mixing together the fibers; for example, glass fibers and/or polymeric fibers may be mixed together, optionally with other fibers, to provide a fiber slurry. In some cases, the slurry is an aqueous-based slurry. In certain embodiments, the glass fibers and/or polymeric fibers, are stored separately in various holding tanks prior to being mixed together. These fibers may be processed through a pulper before being mixed together. In some embodiments, combinations of glass fibers and/or polymeric fibers are processed through a pulper and/or a holding tank prior to being mixed together. It can be appreciated that other components may also be introduced into the mixture, as described herein.

In certain embodiments, two or more layers may be formed by a wet laid process. For example, a first dispersion or slurry (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion or slurry (e.g., another pulp) containing fibers in a solvent (e.g., an aqueous solvent such as water) is applied onto the first layer either at the same time or subsequent to deposition of the first layer on the wire. Vacuum may be continuously applied to the first and second dispersions of fibers during the above process to remove the solvent from the fibers, thereby resulting in a composite article containing first and second layers. The article thus formed is then dried and, if necessary, further processed (e.g., calendered) by using known methods to form multi-layered fiber webs. In some embodiments, such a process may result in a gradient in at least one property across the thickness of the two or more layers, as described herein.

It should be appreciated that any suitable method for creating a fiber slurry may be used. In some cases, additional additives are added to the slurry to facilitate processing. The temperature may also be adjusted to a suitable range, for example, between 33° F. and 100° F. (e.g., between 50° F. and 85° F.). In some embodiments, the temperature of the slurry is maintained. In some cases, the temperature is not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 0.5% by weight.

In some cases, the pH of the fiber slurry may be adjusted as desired. For instance, the pH of the fiber slurry may range between about 1 to about 8 depending on the particular amounts of glass and/or polymeric fibers used. In some cases, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

As discussed above, multiple layers may be appropriately formed, arranged or stacked together. In some embodiments, filter media are formed and laminated together with a suitable adhesive positioned in between layers. Or, filter media may be melt-bonded together, for example, through a suitable heating step.

In some embodiments, the process involves introducing binder (and/or other components) into a layer. In some embodiments, as the layer of a filter media is passed along an appropriate screen or wire, different components included in the binder, which may be in the form of separate emulsions, are added to the layer using a suitable technique. In some cases, each component of the binder resin is mixed as an emulsion prior to being combined with the other components and/or the layer. In some embodiments, the components included in the binder may be pulled through the layer using, for example, gravity and/or vacuum. In some embodiments, one or more of the components included in the binder resin may be diluted with softened water and pumped into the layer.

In some embodiments, a binder may be introduced to the layer by spraying onto the formed filter media, or by any other suitable method, such as for example, size press application, foam saturation, curtain coating, rod coating, amongst others. In some embodiments, a binder material may be applied to a fiber slurry prior to introducing the slurry into a headbox. For example, the binder material may be introduced (e.g., injected) into the fiber slurry and impregnated with and/or precipitated.

During or after formation of a filter media, the filter media may be further processed according to a variety of known techniques. Optionally, additional layers can be formed and/or added to a filter media using processes such as lamination, thermo-dot bonding, ultrasonic, calendering, glue-web, co-pleating, or collation. For example, in some cases, two layers of a filter media are formed into a composite article by a wet laid process as described above, and the composite article is then combined with another layer by any suitable process (e.g., lamination, co-pleating, or collation). In certain embodiments, lamination may be used to attach two or more separately formed layers.

In some embodiments, further processing may involve pleating a filter media or a layer of the filter media. For instance, two layers may be joined by a co-pleating process. In some cases, the filter media, or various layers thereof, may be suitably pleated by forming score lines at appropriately spaced distances apart from one another, allowing the filter media to be folded. It should be appreciated that any suitable pleating technique may be used.

In some embodiments, a filter media can be post-processed such as subjected to a corrugation process to increase surface area within the media. In other embodiments, a filter media may be embossed.

A filter media described herein may be used in an overall filtration arrangement or filter element. In some embodiments, one or more additional layers or components are included with the filter media (e.g., disposed adjacent to the filter media, in contact with one or both sides of the filter media). In some embodiments, multiple layers in accordance with embodiments described herein may be layered together in forming a multi-layer sheet for use in a filter media or element.

The filter media can be incorporated into a variety of filter elements for use in various applications including hydraulic and non-hydraulic filtration applications Exemplary uses of hydraulic filters (e.g., high-, medium-, and low-pressure specialty filters) include mobile and industrial filters. Exemplary uses of non-hydraulic filters include air filters (e.g., heavy duty air filters, automotive air filters, HVAC filters, HEPA filters), fuel filters (e.g., ultra-low sulfur diesel), oil filters (e.g., lube oil filters or heavy duty lube oil filters), chemical processing filters, industrial processing filters, medical filters (e.g., filters for blood), fuel-water separators, and water filters. In some embodiments, a number of layers of the filter media may be wrapped around an inner substrate (e.g., a synthetic or metal core) to form a wrapped filter. For example, a wrapped filter may include between 5 and 10 layers wrapped around the inner substrate. In some cases, the filter media described herein can be used as filter media for coalescing applications (e.g., using a wrapped filter). For example, such a filter media may be used to remove oil from compressed air.

During use, the filter media mechanically traps particles on or in the layers as fluid flows through the filter media. The filter media need not be electrically charged to enhance trapping of contamination. Thus, in some embodiments, the filter media is not electrically charged. However, in some embodiments, the filter media may be electrically charged, as described herein.

The following non-limiting examples serve to further illustrate the present invention:

EXAMPLES

This example compares filter media including a single filtration layer formed of a blend of glass fibers and polymeric fibers comprising at least partially embedded charged particles to filter media formed of only glass fibers, but having a similar basis weights and thicknesses.

In the filtration layers containing a blend of glass fibers and polymeric fibers comprising at least partially embedded charged particles (Samples 1, 2, 4, 5, 6, 7), different amounts of polymeric fibers were used (10%, 20%, or 30% polymeric fibers). The polymeric fibers had an average fiber diameter of less than about 20 microns, an average length between about 1 and about 10 mm, and included either negatively charged or positively charged at least partially embedded particles, as specified in Table 1. The glass fibers had an average diameter between 1-6 microns. The filtration layers were formed using a wet laid handsheet process. The comparative media (Samples 3, 8) included glass fibers having an average diameter between 1-6 microns, and were also formed using a wet laid handsheet process.

After the filter media was prepared, the dust holding capacity and efficiency of each filter media was determined using the ISO 16889 procedure that was modified by testing each filter media sample on a Multipass Filter Test Stand manufactured by FTI. The test used ISO A3 Medium test dust manufactured by PTI, Inc. at an upstream gravimetric dust level of 10 mg/liter. The test fluid was Aviation Hydraulic Fluid AERO HFA MIL H-5606A, manufactured by Mobil. The tests were run at a face velocity of 0.67 cm/s until a terminal pressure of 500 kPa absolute.

The weight percentage of glass fibers and polymeric fibers comprising at least partially embedded charged particles and basis weight for the filtration layers are shown in Table 1. The dust holding capacity, air permeability, tensile strength, elongation, mean flow pore size (MFP), hydraulic gamma, and efficiency of the filtration layer are also shown in Table 1.

TABLE 1

| Fiber blend | Sample # | Basis weight g/m² | Thickness mm | Air perm CFM/sf | Unit Air (CFM/sf)/ (g/m²) | Tensile MD N/15 mm | Elongation % | DHC g/m² | Beta 200 Effic. μm | MFP μm | "γ" |
|---|---|---|---|---|---|---|---|---|---|---|---|
| 90% Glass 10% Polymer Neg. Charge | 1 | 82 | 0.51 | 19.2 | 0.23 | 4.4 | 0.6 | 100 | 5.1 | 8.4 | 19.2 |
| 90% Glass 10% Polymer Pos. Charge | 2 | 84 | 0.48 | 18.1 | 0.22 | 4.7 | 0.88 | 95 | 5 | 8 | 18.6 |
| Benchmark 7.6 mbar 100% Glass | 3 | 83 | 0.46 | 16.9 | 0.20 | 4.0 | 0.5 | 77 | <50 | 7.2 | 18.4 |
| 80% Glass 20% Polymer Neg. Charge | 4 | 85 | 0.55 | 17.1 | 0.20 | 4.2 | 0.62 | 100 | 5 | 8 | 17.9 |
| 80% Glass 20% Polymer Pos. Charge | 5 | 85 | 0.48 | 17.3 | 0.20 | 4.4 | 0.72 | 103 | <5 | 8.7 | 19.9 |
| 70% Glass 30% Polymer Neg. Charge | 6 | 81 | 0.46 | 26.8 | 0.33 | 2.1 | 1.14 | 115 | 6.5 | 10.9 | 19.4 |
| 70% Glass 30% Polymer Pos. Charge | 7 | 88 | 0.48 | 23.6 | 0.27 | 6.4 | 1.31 | 98 | 6 | 10.5 | 19 |
| Benchmark 5.7 mbar 100% Glass | 8 | 83 | 0.46 | 21.9 | 0.26 | 3.5 | 0.5 | 76 | 7 | 9.4 | 15.4 |

This example shows that filter media including a single filtration layer formed of a blend of glass fibers and polymeric fibers comprising at least partially embedded charged particles (Samples 1, 2, 4, 5, 6, 7) had a higher dust holding capacity, a higher air permeability (lower air resistance), and a higher hydraulic gamma compared to filter media formed of only glass fibers, but having a similar basis weight and beta 200 efficiency (Samples 3, 8).

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:
1. A filter media, comprising:
a non-woven web comprising:
a plurality of glass fibers having an average fiber diameter of less than or equal to about 10 microns; and
a plurality of polymeric fibers comprising a polymeric material and having an average fiber diameter of greater than or equal to about 5 microns, wherein the polymeric fibers comprise a plurality of charged particles having an average diameter of greater than or equal to about 0.01 microns, wherein at least a portion of the particles are fully embedded within the polymeric material of the plurality of polymeric fibers, and wherein the non-woven web has an air permeability of greater than or equal to about 5 cfm/sf and less than or equal to about 400 cfm/sf and a basis weight of greater than or equal to about 30 g/m² and less than or equal to about 400 g/m².

2. A filter media according to claim 1, wherein the non-woven web includes greater than or equal to about 10 wt % of the polymeric fibers.

3. A filter media according to claim 1, wherein the non-woven web includes greater than or equal to about 20 wt % of the polymeric fibers.

4. A filter media according to claim 1, wherein the non-woven web has a thickness between about 0.1 mm and about 1.2 mm.

5. A filter media according to claim 1, wherein the non-woven web is formed using a wet laid process.

6. A filter media according to claim 1, wherein the glass fibers have an average fiber diameter of less than or equal to about 5 microns.

7. A filter media according to claim 1, wherein the polymeric fibers have an average fiber diameter that is greater than the average fiber diameter of the glass fibers.

8. A filter media according to claim 1, wherein the polymeric fibers have an average fiber diameter of less than or equal to about 20 microns.

9. A filter media according to claim 1, wherein the polymeric fibers have a length of less than or equal to about 5 cm.

10. A filter media according to claim 1, wherein the polymeric fibers comprise a polyester, an acrylic, a polyolefin, and/or a polyamide.

11. A filter media according to claim 1, wherein the plurality of charged particles have a net negative charge.

12. A filter media according to claim 1, wherein the plurality of charged particles comprise $SO_3^{2-}$, $CO_3^{2-}$, $PO_4^3$, $SO_4^{2-}$, $NO_3^-$, and/or $CrO_4^{2-}$.

13. A filter media according to claim 1, wherein the plurality of charged particles have a net positive charge.

14. A filter media according to claim 1, wherein the plurality of charged particles comprise $Ca^{2+}$, $Mg^{2+}$, $Na^+$, $Ag^+$, $Zn^+$, $K^+$, $Cut$, and/or $Al_3^+$.

15. A filter media according to claim 1, wherein the plurality of charged particles have an average diameter of less than or equal to about 0.5 microns.

16. A filter media according to claim 1, wherein the non-woven web has a hydraulic gamma of at least about 8.

17. A filter media according to claim 1, wherein the non-woven web has an air permeability of greater than or equal to about 15 cfm/sf.

18. A method comprising passing a fluid across a filter media the filter media comprising:
   a non-woven web comprising:
   a plurality of glass fibers having an average fiber diameter of less than or equal to about 10 microns; and
   a plurality of polymeric fibers comprising a polymeric material and having an average fiber diameter of greater than or equal to about 5 microns, wherein the polymeric fibers comprise a plurality of charged particles having an average diameter of greater than or equal to about 0.01 microns, wherein at least a portion of the particles are fully embedded within the polymeric material of the plurality of polymeric fibers, and wherein the non-woven web has an air permeability of greater than or equal to about 5 cfm/sf and less than or equal to about 400 cfm/sf and a basis weight of greater than or equal to about 30 g/m² and less than or equal to about 400 g/m².

19. A filter media according to claim 1, wherein the polymeric fibers comprise a regenerated cellulose.

20. A filter media according to claim 1, wherein the filter media has a mean flow pore size of greater than or equal to 3 microns and less than or equal to 30 microns according to ASTM E1294 (2008).

* * * * *